UNITED STATES PATENT OFFICE.

JOHN ROBERT KÖHLER, OF STOCKHOLM, SWEDEN.

PRODUCING PURIFIED RESIN FROM NATURAL RESIN OF CONIFERS AND THE LIKE.

1,316,842.   Specification of Letters Patent.   Patented Sept. 23, 1919.

No Drawing.   Application filed April 22, 1918.   Serial No. 230,082.

*To all whom it may concern:*

Be it known that I, JOHN ROBERT KÖHLER, a citizen of the Kingdom of Sweden, residing at Stockholm, Sweden, have invented new and useful Improvements in Producing Purified Resin from Natural Resin of Conifers and the like, of which the following is a specification.

This invention relates to an improved method of producing purified resin of high quality from natural resin of conifers and the like.

As raw material for producing common resin (colophony) turpentine or natural resin in a fresh state, as obtained by collecting the same from conifers, have hitherto been used. After such collection deposits of old resin are successively formed on the trees, said resin not being adapted to be utilized rationally, since on treating the same according to known methods, it gives a colophony of less or no value. This is also the case with old resin flowing out by itself and available to be collected in the woods of conifers.

Special methods of utilizing the resin remaining on the conifers after a rationally performed collection as well as the resin flowing out by itself and adapted to be collected on the trees have been suggested. Owing to the great quantity of bark and other impurities accompanying the resin, when collected, extraction as a rule by means of alcohol or a mixture of alcohol and other solvents has been used for the purpose of obtaining pure resin, the extraction being effected at raised temperature in order to dissolve the resin as perfectly as possible. The resin obtained in this way after vaporizing the solvent is, however, dark-colored and in other respects also of low quality, the resin, it is true, being soluble in alcohol, but in part only in oil of turpentine and linseed-oil, whereas a good colophony should be completely soluble in oil of turpentine and linseed-oil as well as in alcohol.

I have found that old natural resin of conifers forms a mixture of amorphous substances consisting substantially of oxidized resin acids and crystallizable resin acids. Said principal constituents of the resin occurring in various proportions, mainly depending upon the age of the resin present various properties as to the solubility, certain solvents dissolving the crystallizable resin acids, but not the amorphous oxidized products. Both constituents are, for instance, easily dissolved in alcohol, whereas the amorphous oxidized products are substantially insoluble in oils. Consequently by the aforementioned known method consisting in extraction by means of alcohol, said both constituents of the resin are dissolved, the resin obtained being, however, of less value, while containing substances insoluble in oils.

According to the present invention the observation made by me, concerning the different solubility of the crystallizable and the amorphous products, is utilized in producing from old resin of conifers a colophony of high quality by effecting the extraction by the aid of a solvent dissolving not at all or to a small extent only the amorphous constituents of the natural resin, the solvent being vaporized and the remainder forming a light-colored resin of high value. As solvents of this kind, petrol, benzol, and oil of turpentine, may for instance be mentioned. Some of these solvents, for instance oil of turpentine, dissolve in a hot state the oxidized, amorphous substances also, and owing thereto the extraction, when using such solvents, is to be effected at ordinary temperature. The solvent should be used in such quantity that rather diluted solutions of the crystallizable resin acids are obtained, since in this case the amorphous substances are dissolved to the least possible extent. In order to obtain a quick and complete solution of the crystallizable resin acids, it is of importance that the resin be finely divided.

Example: To 600 kilograms of ground and sifted old natural resin containing 110 kilograms of solid impurities, 750 kilograms oil of turpentine in a cold state were added and stirred for four hours. The solution was filtered and the remainder was washed twice with 250 kilograms of oil of turpentine each time. The oil of turpentine dissolved 210 kilograms of resin which after vaporizing the oil of turpentine was obtained in a solid state as a light-colored colophony of high quality.

Instead of using the resin in the natural state, the oil of turpentine contained in the same may, before using the solvent, be removed according to known methods, for instance by the aid of steam.

I claim—

1. The process of producing colophony soluble in alcohol as well as in oils from old natural resin, water-resin and the like, consisting in extracting the crystallizable resin acids of the raw material by means of a solvent capable of solving said resin acids, but not at all or to a small extent only the amorphous oxidized resin acids of said material, and vaporizing the solvent from the solution obtained.

2. Process of producing colophony soluble in alcohol as well as in oils from old natural resin, water-resin and the like, consisting in pulverizing the raw material, extracting the crystallizable resin acids of the raw material by means of a solvent capable of solving said resin acids, but not at all or to a small extent only the amorphous oxidized resin acids of said material, and vaporizing the solvent from the solution obtained.

In testimony whereof I have signed my name.

JOHN ROBERT KÖHLER.